United States Patent Office 3,708,491
Patented Jan. 2, 1973

3,708,491
2-AMINO(PERFLUOROALKYLSULFONAMIDO-PHENYL)THIAZOLES
Joseph K. Harrington, Edina, Donald C. Kvam, North Oaks, Arthur Mendel, Vadnais Heights, and Jerry E. Robertson, North Oaks, Minn., assignors to Riker Laboratories, Inc., Northridge, Calif.
No Drawing. Continuation-in-part of application Ser. No. 837,900, June 30, 1969, which is a continuation-in-part of application Ser. No. 588,338, Oct. 21, 1966. This application May 11, 1971, Ser. No. 142,380
Int. Cl. C07d 91/34
U.S. Cl. 260—306.8 R 4 Claims

ABSTRACT OF THE DISCLOSURE

N-substituted perfluoroalkanesulfonamides in which the sulfonamide nitrogen substituent is (2-aminothiazolyl)phenyl. Also included are processes for the preparation and use of said compounds. The compounds are active as antimicrobial agents and polymerization catalysts.

---

This application is a continuation-in-part of copending application Ser. No. 837,900 filed June 30, 1969 (now U.S. Patent No. 3,642,817), which is, in turn, a continuation-in-part of copending application Ser. No. 588,338 filed Oct. 21, 1966 (now abandoned).

The invention relates to perfluoroalkanesulfonamides N-substituted by a (2-aminothiazolyl)phenyl group. These compounds have activity as anti-microbial agents and polymerization catalysts. The invention also includes processes for the preparation and use of the compounds.

DETAILED DESCRIPTION

According to the present invention, there is provided a class of compounds consisting of perfluoroalkanesulfonamides having the general formula:

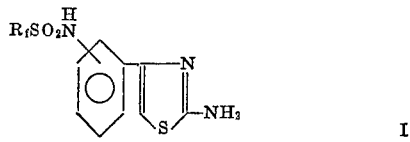

I wherein $R_f$ is a perfluoroalkyl group containing one to four carbon atoms.

Due to the acidity of the hydrogen of the sulfonamido group of Formula I, the compounds of the invention are catalysts for certain acid-catalyzed polymerizations, e.g. epoxide polymerizations. The compounds of the invention are anti-microbial agents, according to standard test procedures.

Preferably $R_f$ in the compounds of the invention is trifluoromethyl. Such compounds offer more efficient utilization of fluorine, since compounds containing longer fluorinated chains are more expensive but do not offer any substantial increase in anti-microbial effectiveness.

The anti-microbial activity was determined by a standard test procedure which is a variation of the original agar-plate diffusion method of Vincent and Vincent.

Leading references to the method used are: Vincent, J. G., and Vincent, Helen W., Proc. Soc. Exptl. Biol. Med. 55:162–164, 1944, and Davis, B. D., and Mingioli, E. S., Jour. Bact. 66:129–136, 1953.

Broadly speaking, the compounds of this invention are readily prepared by one or all of the following methods, each of which is illustrated by an equation.

METHOD A

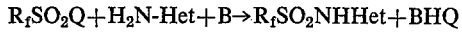

where Q is a halogen or perfluoroalkanesulfonate residue, B is an organic or inorganic base which acts as an acid acceptor, Het is the (2-aminothiazolyl)phenyl moiety and $R_f$ is as defined above.

A solution of the appropriate primary amine and an equimolar quantity of a suitable acid acceptor (such as triethylamine, dimethylaniline (pyridine and the like) in an inert organic solvent is ordinarily used. However, an acid acceptor is not always necessary, and an excess of the primary amine may also serve as acid acceptor. Among the suitable solvents are 1,2-dimethoxyethane, benzene, chloroform, dichloromethane, dimethylacetamide, dimethylformamide and the like. Alternatively, an excess of the primary amine or the acid acceptor may serve as a solvent, or the reaction may be carried out in the absence of solvent. Generally, an equimolar quantity of the appropriate perfluoroalkanesulfonic anhydride or halide is added to the solution. The addition is advantageously carried out at −15° C. to 100° C., and for some reactants higher or lower temperatures may be preferable. In cases where the amine is of lower reactivity, it is advantageous to allow the reaction mixture to remain at reflux temperature for a few hours following addition.

The reaction of Method A may also be carried out in a high pressure reactor. This technique is particularly preferred when perfluoroalkanesulfonyl fluorides are used as reactants. These reactions are usually carried out at temperature ranges of 0 to 150° C., but these temperature ranges may be raised or lowered, depending upon the reactants used. Such reactions are most frequently carried out without solvent, or with dimethylformamide or excess triethylamine as solvent, but other advantageous variations are possible.

After completion of the reaction, the product is isolated by conventional methods. For example, the reaction mixture can be extracted with excess aqueous sodium hydroxide. The aqueous extract is then washed with organic solvents and treated with charcoal to remove impurities. Subsequent acidification of the aqueous extract with mineral acid then affords the product as an oil or solid which is distilled, sublimed, chromatographed or recrystallized as required to give pure product. When water-soluble solvents are used, the reaction mixture can be poured directly into aqueous mineral acids. The product is then isolated by conventional extraction techniques and purified as above.

METHOD B

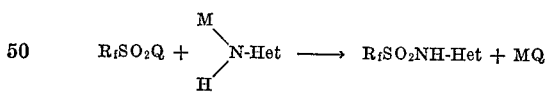

where M is an alkali metal and Q, $R_f$ and Het are as defined above.

An alkali metal salt of the appropriate amine is prepared by any of several conventional methods such as by reaction with sodium naphthalene, a metal hydride such as sodium hydride, alkoxides such as potassium t-butoxide in protic or aprotic solvents, or by reaction with an alkali metal such as sodium or potassium directly in an appropriate solvent.

The resulting salt is then treated with a perfluoroalkanesulfonyl alkylating agent such as trifluoromethane sulfonyl fluoride or chloride or trifluoromethanesulfonic anhydride, either at atmospheric pressure in open apparatus or under pressure in a pressure vessel. The reaction takes place at 0° to 150° C., depending on the reactivity of the amine and the sulfonyl halide. On completion of the reaction, the product is obtained by conventional work-up techniques as described in Method A.

METHOD C $$R_fSO_2NHZ + X\text{-Het} \rightarrow R_fSO_2NH\text{-Het} + ZX$$

Formula II $R_f$ and Het are as defined above, X is halogen and Z is an alkaline earth or alkali metal. The perfluoroalkanesulfonamide salt and an appropriate halide of Formula II are reacted, generally in a suitable solvent (such as dimethylsulfoxide, dimethylformamide, 1,2 - dimethoxyethane, dimethylacetamide and the like). Heating or cooling, usually the former, may be advantageous to obtain a desirable rate of reaction.

After the completion of the reaction, the product is isolated by conventional methods. For example, when the reaction mixture is diluted with water the product may precipitate. Alternatively, the product may be extracted from the reaction mixture after dilution with water. Other recovery techniques are well known to those skilled in the art.

The reaction of Method C may also be carried out in a high pressure reactor.

Method C is usually most valuable when the halide is activated by suitable electron-withdrawing groups on the ring. Suitable halides for use in Method C are well known to the art, as are salts of perfluoroalkanesulfonamides.

Suitable perfluoroalkanesulfonyl anhydrides and halides (e.g. chlorides and fluorides) for use in these procedures are known to the art (thus see U.S. Pat. 2,732,398). Similarly, the amines used in producing the compounds of this invention are described in the general chemical literature or are otherwise known to those skilled in the art.

Methods A, B and C are generally applicable (preferably Method A) to the preparation of compounds of the invention. However, it is sometimes preferable, in order to increase yields and minimize purification problems, to prepare certain compounds of the invention from compounds already containing the perfluoroalkylsulfonamido group by conventional procedures.

The following example is given for the purpose of further illustrating the procedures of the present invention, but is not intended, in any way, to be limiting on the scope thereof. Thus, while the example relates to perfluoromethanesulfonamides, other perfluorocarbon groups can be substituted in place thereof.

EXAMPLE

To a stirred and refluxing solution of 1.52 g. (20 mmoles) of thiourea in 25 ml. of absolute ethanol was added dropwise over one hour a solution of 6.92 g. (20 mmoles) of 4-trifluoromethylsulfonamidophenacyl bromide in 50 ml. of absolute ethanol. Thereafter, the yellow solution was refluxed for two hours and concentrated to ca. 25 ml. It was chilled and diluted incrementally with ether prior to the cloud point. Continued dilution with ether and subsequent chilling yielded solid product. It was obtained as a white solid by recrystallization from acetone-ether. The pure, white solid 2-amino-4-(4-trifluoromethylsulfonamidophenyl)thiazole hydrobromide, melted at 205-207°.

*Analysis.*—Calculated for $C_{10}H_9BrF_3N_3S_2O_2$ (percent): C, 29.7; H, 2.2; F, 14.1. Found (percent): C, 28.9; H, 2.5; F, 13.5.

The 4 - trifluoromethylsulfonamidophenacyl bromide was prepared by bromination of 4-acetyltrifluoromethanesulfonanilide with cupric bromide according to L. C. King and G. K. Ostrum, J. Org. Chem. 29, 3459 (1964). 4-acetyltrifluoromethanesulfonanilide was prepared from 4-aminoacetophenone according to Method A.

The free base, 2 - amino - 4 - (4-trifluoromethylsulfonamidophenyl)thiazole is prepared by careful neutralization of the hydrobromide salt with an equimolar amount of dilute base.

The free base will react with an excess of hydrochloric acid to form the hydrochloride salt. The other hydrobromide and hydrochloride salts of the invention can be prepared by analogous reactions.

What is claimed is:
1. A compound of the formula:

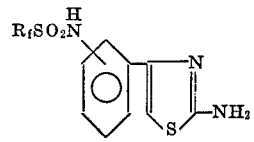

wherein $R_f$ is a perfluoroalkyl group containing one to four carbon atoms, and hydrobromide and hydrochloride salts thereof.

2. A compound according to claim 1 wherein $R_f$ is trifluoromethyl.

3. The compound 2-amino-4-(4-trifluoromethylsulfonamidophenyl)thiazole hydrobromide according to claim 1.

4. The compound 2-amino-4(4-trifluoromethylsulfonamidophenyl)thiazole according to claim 1.

References Cited

UNITED STATES PATENTS 3,637,729   1/1972   Harrington et al. __ 260—308 R

ALEX MAZEL, Primary Examiner

R. J. GALLAGHER, Assistant Examiner

U.S. Cl. X.R.

260—556 F, 999